Patented July 17, 1928.

1,677,545

UNITED STATES PATENT OFFICE.

OTTO BRAUNSDORF AND EDUARD HOLZAPFEL, OF HOCHST-ON-THE-MAIN, AND PAUL NAWIASKY, OF LUDWIGSHAFEN-ON-THE-RHINE, GERMANY, ASSIGNORS TO GRASSELLI DYESTUFF CORPORATION, OF NEW YORK, N. Y., A CORPORATION OF DELAWARE.

HALOGEN DERIVATIVE OF THE BENZANTHRONE SERIES AND PROCESS OF MAKING SAME.

No Drawing. Application filed March 23, 1926, Serial No. 96,869, and in Germany March 27, 1925.

The present invention relates to new halogen derivates of sulfur-containing compounds of the benzanthrone series, and to a process of preparing the same.

We have found that benzanthronyl mercaptans or benzanthrone disulfides or sulfides or other thio-ethers of benzanthrone—for instance alkyl- or aryl-thioether of the general formula X—S—Y, wherein X represents a benzanthronyl residue (substituted or not), and Y represents a substituted or unsubstituted alkyl,- aryl,- aralkyl,- or aliphatic acidyl-group, or a hydrogen atom—as they may be obtained according to U. S. Patent application Ser. No. 47,966 filed August 3, 1925, are converted into new halogenated compounds by treating them with a halogen or an agent splitting off halogen.

The following examples serve to illustrate our invention, all parts being by weight:

(1) 10 parts of Bz1-benzanthronyl mercaptan having the probable formula:

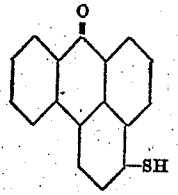

are introduced, while stirring, into 100 parts of chlorosulfonic acid at —5° C. and there are then gradually added 3.1 parts of bromine. When the reaction is complete, the mass is poured on ice and the brominated product is isolated in the usual manner. It forms a dark yellow powder which dissolves in concentrated sulfuric acid with a claret-red color, and when in a dilute solution with a blue color. It probably constitutes a dibromo-Bz1,Bz1'-benzanthronyldisulfide having the probable formula:

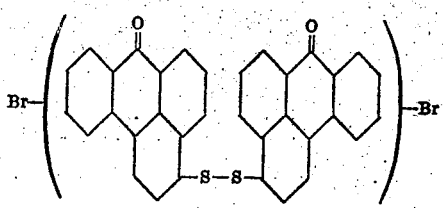

(2) 10 parts of Bz1, Bz1'-benzanthronylsulfide, of the probably formula:

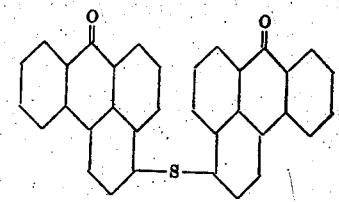

are stirred in 100 parts of nitrobenzene with 10 parts of sulfuryl chloride at 50–75° C. until the evolution of hydrochloric acid has ceased. After cooling the product is filtered by suction and washed with alcohol. The yellow powder thus obtained probably constitutes a dichloro-Bz1, Bz1'-benzanthronylsulfide of the probable formula:

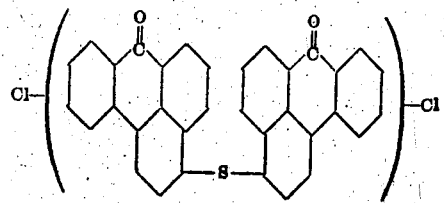

and is soluble in concentrated sulfuric acid to a violet solution.

(3) 25 parts of 6,6' diamino-Bz1, Bz1'-benzanthronylsulfide—as it can be produced by causing 6-nitro-Bz1-bromobenzanthrone to react with sodium disulfide,—are introduced and stirred in 250 parts of nitrobenzene; this mixture is heated to 50–60° C. and at this temperature treated with 25–30 parts of sulfuryl chloride until the evolution of hydrochloric acid has ceased. After cooling the mass is filtered by suction and the product of the reaction is freed from the nitrobenzene by washing it with ethyl alcohol. It forms a brown powder which dissolves in concentrated sulfuric acid to a violet solution. It probably constitutes a dichlorodiamino-benzanthronylsulfide having the probable formula:

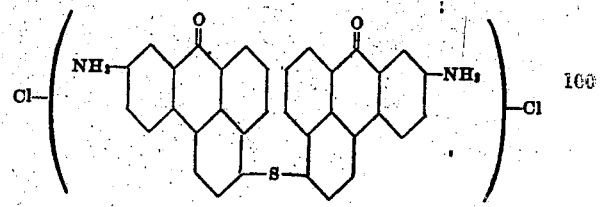

(4) 100 parts of Bz1, Bz1'-benzanthronylsulfide are stirred in 1000 parts of chlorosulfonic acid at −5° C. with 17 parts of bromine until all the bromine is consumed. The monobromo-Bz1, Bz1'-benzanthronylsulfide, after being isolated in the usual manner, forms an orange-yellow powder which dissolves in concentrated sulfuric acid to a bluish-green solution.

(5) If in Example 4 the 17 parts of bromine are replaced by 32 parts of bromine, a dibromo-Bz1, Bz1'-benzanthronylsulfide is obtained as a yellow powder which dissolves in concentrated sulfuric acid to a green solution. The crude product may be purified by re-crystallization from nitrobenzene.

(6) 10 parts of Bz1, Bz1'-benzanthronylsulfide are introduced, while stirring, into 100 parts of concentrated sulfuric acid; there are then gradually added 8.5 parts of bromine and the mass is stirred at 60–70° until the bromine is consumed. After cooling, the mass is poured on ice, the yellowish-brown product which separates is filtered off by suction and washed until neutral. After being dried, it constitutes a yellowish-brown powder which dissolves in concentrated sulfuric acid to a bluish-green solution. It probably constitutes a tribromo-benzanthronylsulfide.

(7) One part of Bz1-benzanthronylthioglycollic acid of the formula:

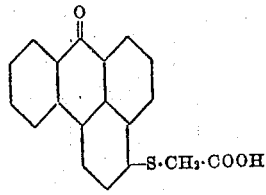

is introduced into ten times the quantity of bromine and stirred, without any external heating, until there is no further splitting off of hydrogen bromide. The reaction-mixture is then freed from the excess of bromine by means of an indifferent organic solvent. There remains an orange-colored powder which dissolves in concentrated sulfuric acid to a red solution, in alkalies to an orange-brown solution. It probably constitutes a dibromo-Bz1-benzanthronylthioglycollic acid of the probable formula:

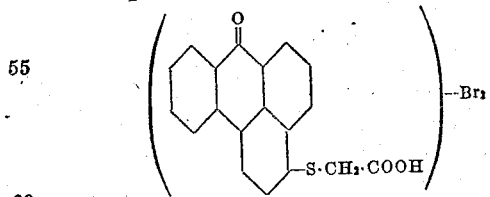

We claim:
1. Process of producing halogen derivatives of the benzanthrone series, consisting in treating with halogenating agents sulfur compounds of the following composition:

X—S—Y wherein X stands for a benzanthronyl residue—which may be substituted or not—and Y stands for a substituted or not-substituted alkyl- aryl- or aralkyl group, an aliphatic acidyl group or a hydrogen atom.

2. Process of producing halogen derivatives of the benzanthrone series consisting in treating with halogenating agents, in the presence of a diluent, sulfur compounds of the following composition:

X—S—Y wherein X stands for a benzanthronyl residue—which may be substituted or not—and Y stands for a substituted or not-substituted alkyl- aryl- or aralkyl group, an aliphatic acidyl group or a hydrogen atom.

3. Process of producing halogen derivatives of the benzanthrone series, consisting in treating Bz1, Bz1'-benzanthronylsulfide with a halogenating agent.

4. Process of producing halogen derivatives of the benzanthrone series, consisting in treating Bz1, Bz1'-benzanthronylsulfide with a halogenating agent in the presence of a diluent.

5. As new products, halogenated sulfur compounds of the benzanthrone series of the following formula:—

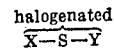

wherein X stands for a benzanthronyl residue—which may be substituted or not—and Y stands for a substituted or not-substituted alkyl- aryl- or aralkyl group, an aliphatic acidyl group or a hydrogen atom.

6. As a new product, monobromo-Bz1, Bz1'-benzanthronylsulfide, being a yellow powder, soluble in concentrated sulfuric acid to a bluish-green solution.

7. As new products, halogenated sulfur compounds of the benzanthrone series having the type formula:

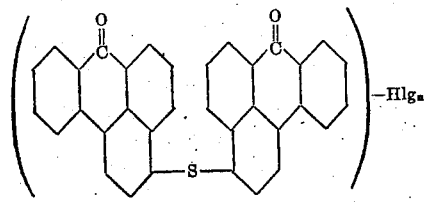

wherein Hlg represents halogen and $n$ represents a whole number not greater than 3.

In testimony whereof, we affix our signatures.

OTTO BRAUNSDORF.
EDUARD HOLZAPFEL.
PAUL NAWIASKY.